(12) United States Patent
Tooman et al.

(10) Patent No.: US 7,845,925 B2
(45) Date of Patent: Dec. 7, 2010

(54) VALVE GATE ASSEMBLY

(75) Inventors: Patrick A. Tooman, Clarkston, MI (US); Bruce Casey, White Lake, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 0 days.

(21) Appl. No.: 12/462,457

(22) Filed: Aug. 4, 2009

(65) Prior Publication Data

US 2009/0291160 A1 Nov. 26, 2009

Related U.S. Application Data

(63) Continuation of application No. 11/888,584, filed on Aug. 1, 2007, now Pat. No. 7,588,436, which is a continuation-in-part of application No. 11/447,718, filed on Jun. 6, 2006, now Pat. No. 7,275,923, which is a continuation of application No. 10/985,227, filed on Nov. 10, 2004, now Pat. No. 7,121,820.

(60) Provisional application No. 60/519,312, filed on Nov. 11, 2003.

(51) Int. Cl.
*B29C 45/23* (2006.01)
(52) U.S. Cl. ........................ 425/146; 425/564
(58) Field of Classification Search .......... 425/146, 425/562, 563, 564, 565, 566
See application file for complete search history.

(56) References Cited

U.S. PATENT DOCUMENTS

| | | | |
|---|---|---|---|
| 4,173,448 A | 11/1979 | Rees et al. | |
| 4,810,184 A | 3/1989 | Gellert et al. | |
| 4,964,795 A | 10/1990 | Tooman | |
| 5,470,219 A | 11/1995 | Yokoyama et al. | |
| 5,491,372 A | 2/1996 | Erhart | |
| 5,531,581 A | 7/1996 | Donnell, Jr. | |
| 5,557,154 A | 9/1996 | Erhart | |
| 5,670,190 A | 9/1997 | Osuna-Diaz | |
| 5,738,138 A | 4/1998 | Grunert et al. | |
| 5,783,234 A | 7/1998 | Teng | |
| 5,820,803 A | 10/1998 | Hashimoto | |
| 5,834,041 A | 11/1998 | Sekine et al. | |

(Continued)

FOREIGN PATENT DOCUMENTS

DE 44 09 822 A1 8/1995

(Continued)

OTHER PUBLICATIONS

"Exlar-GS Series Linear Actuator Overview"; webpage, http://www.exlar.com/prod_GS_Leg_oview.html; Exlar Corporation; 3 pages; Chanhassen, Minnesota, Mar. 9, 2005.

(Continued)

*Primary Examiner*—Tim Heitbrink
(74) *Attorney, Agent, or Firm*—Warn Partners, P.C.

(57) ABSTRACT

A valve gate assembly for regulating a flow of molten material into a mold. The valve gate assembly includes a movable valve that can be positioned between a fully closed position and a fully open position. The valve gate assembly further includes an actuating system operatively cooperating with the valve to move the valve and infinitely position the valve between the fully closed position and the fully open position.

32 Claims, 10 Drawing Sheets

U.S. PATENT DOCUMENTS

| | | | |
|---|---|---|---|
| 5,840,231 A | 11/1998 | Teng | |
| 5,919,492 A | 7/1999 | Tarr et al. | |
| 6,074,191 A | 6/2000 | Gellert et al. | |
| 6,086,357 A | 7/2000 | Steil et al. | |
| 6,099,767 A | 8/2000 | Tarr et al. | |
| 6,129,541 A | 10/2000 | Takeda | |
| 6,179,604 B1 | 1/2001 | Takeda | |
| 6,294,122 B1 | 9/2001 | Moss et al. | |
| 6,343,925 B1 | 2/2002 | Jenko | |
| 6,361,300 B1 | 3/2002 | Kazmer et al. | |
| 6,436,320 B1 | 8/2002 | Kazmer et al. | |
| 6,464,909 B1 | 10/2002 | Kazmer et al. | |
| 6,514,440 B1 | 2/2003 | Kazmer et al. | |
| 6,638,049 B1 | 10/2003 | Moss et al. | |
| 7,121,820 B2 | 10/2006 | Tooman et al. | |
| 7,275,923 B2 | 10/2007 | Tooman et al. | |
| 7,588,436 B2 * | 9/2009 | Tooman et al. | 425/564 |
| 2003/0155672 A1 | 8/2003 | Kazmer et al. | |
| 2003/0214065 A1 | 11/2003 | Doyle et al. | |
| 2006/0222726 A1 | 10/2006 | Tooman et al. | |
| 2008/0014296 A1 | 1/2008 | Tooman et al. | |

FOREIGN PATENT DOCUMENTS

JP        4 175 125      6/1992

OTHER PUBLICATIONS

"Exlar-GSX Series Linear Actuator Overview"; webpage, http://www.exlar.com/prod_GS_Leg_oview.html; Exlar Corporation; 3 pages; Chanhassen, Minnesota, Mar. 9, 2005.

Ewikon brochure; EWIKON Heisskananalsysteme GmbH & Co. KG; Oct. 2005; 6 pages; Frankenberg, Germany.

* cited by examiner

VALVE GATE ASSEMBLY

CROSS-REFERENCE TO RELATED APPLICATIONS

This application is a Continuation of U.S. patent application Ser. No. 11/888,584, filed Aug. 1, 2007, now U.S. Pat. No. 7,588,436 which is a continuation-in-part of U.S patent application Ser. No. 11/447,718 filed on Jun. 6, 2006, now U.S. Pat. No. 7,275,923 which is a continuation of U.S. patent application Ser. No. 10/985,227 filed on Nov. 10, 2004 (now U.S. Pat. No. 7,121,820), which claims the benefit of Provisional Application No. 60/519,312, filed on Nov. 11, 2003. The disclosures of the above applications are incorporated herein by reference.

FIELD OF THE INVENTION

The present invention relates generally to valve gates and, more particularly, to a valve gate assembly for regulating a flow of molten material into a cavity of a mold.

BACKGROUND OF THE INVENTION

Injection molding is a widely known manufacturing process used to produce a variety of parts. Injection molding involves introducing a molten material, for example a molten plastic or resin, into a cavity within a mold until the cavity is filled. The molten material hardens or cures in the mold in the shape of inner surfaces of the cavity. After the molten material hardens or cures, the hardened or cured material is removed from the cavity.

For injection molding, a manifold is typically used for conveying molten material from a central injection portion or sprue to a number of cavities or to multiple points within one large cavity of the mold. An example of such a manifold is disclosed in U.S. Pat. No. 4,964,795 to Tooman. In that patent, a manifold has a passageway through which a molten material may pass. The terminal end of the passageway, called a gate, is in fluid communication with the cavity of the mold.

In addition, a valve gate is typically used with the manifold to regulate the flow of molten material into the cavity of the mold. An example of such a valve gate is disclosed in U.S. Pat. No. 4,173,448 to Rees et al. In that patent, a valve gate is disposed adjacent the gate and includes a valve rod or pin partially disposed within the passageway that has a terminal end positioned such that it closes the gate and prevents the flow of molten material through the gate. However, the pin can move axially away from the gate and, as it moves farther away from the gate, the flow of the molten material through the gate increases.

It is known to provide an actuator to move the pin of the valve gate. Typically, the actuator is of a pneumatic or hydraulic type. The actuator moves the pin of the valve gate from a fully closed position to a fully open position. In the fully open position, the pin is positioned away from the gate, and molten material flows out the passageway through the gate into the cavity of the mold. When the cavity is full, the pin of the valve gate is moved to the fully closed position, thereby plugging the gate and stopping the flow of the molten material out of the passageway into the mold.

One disadvantage of the above-described valve gates is that the pneumatic actuator requires air valves because air is inconsistent in pressure. Another disadvantage of the valve gates is that the hydraulic actuator may leak oil, which is undesired. Yet another disadvantage of the valve gates is that the pin can only be positioned at the fully open position or at the fully closed position, and cannot be positioned between these two positions. A further disadvantage of the valve gates is that they are relatively slow and not very accurate in positioning of the pin.

Therefore, it is desirable to provide a new valve gate that can be infinitely positioned between a fully opened and fully closed position, providing greater control over the flow of molten material into a mold. It is also desirable to provide a valve gate that has an actuator that eliminates the use of pneumatics or hydraulics. It is further desirable to provide a valve gate that has relatively fast actuation and accurate positioning. Therefore, there is a need in the art to provide a valve gate that meets these desires.

SUMMARY OF THE INVENTION

Accordingly, the present invention provides a valve gate assembly for an injection molding machine which regulates the flow of molten material into a mold with precision. The valve gate assembly includes a movable valve that can move between a fully closed position and a fully open position. The valve gate assembly further includes an actuating system operatively cooperating with the valve to move the valve and infinitely position the valve between the fully closed position and the fully open position.

One advantage of the present invention is that a valve gate assembly is provided for regulating a flow of molten material into a mold with more control over the molding process. Another advantage of the present invention is that the valve gate assembly can infinitely adjust the position of the valve during the molding process, thereby adjusting the flow rate of the molten material into the mold. Yet another advantage of the present invention is that the valve gate assembly has fast adjustment of the valve and accurate adjustment of the valve to 0.001 inches. Still another advantage of the present invention is that the valve gate assembly eliminates the use of hydraulics, thereby eliminating oil leaks into the mold. A further advantage of the present invention is that the valve gate assembly eliminates the use of pneumatics, thereby eliminating air valves. Yet a further advantage of the present invention is that the valve gate assembly is consistent and not controlled by pressure.

According to the present invention, there is provided a valve gate assembly having a valve operably associated with a valve gate of an injection molding manifold. An actuator assembly is operably coupled to said valve. The actuator assembly includes an outer member coupled to an axially moveable output shaft through a transmission assembly. Relative rotation between the outer member and the output shaft translates through the transmission assembly for driving the valve and opening the valve gate.

Other features and advantages of the present invention will be readily appreciated, as the same becomes better understood, after reading the subsequent description taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
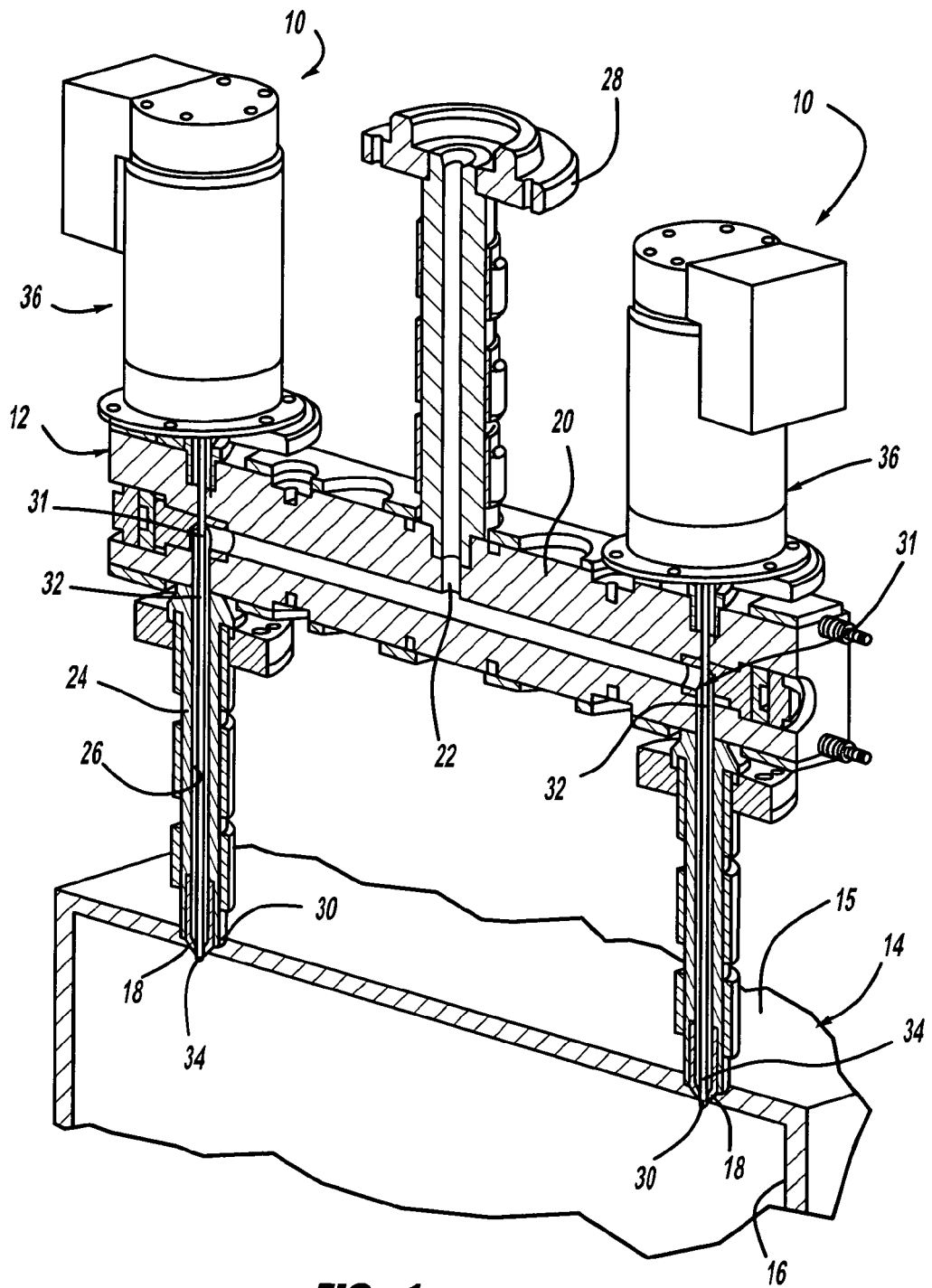
FIG. 1 is a fragmentary perspective view of a valve gate assembly, according to the present invention, illustrated in operational relationship with a manifold assembly and a mold.

Referring to the drawings, and in particular FIG. 1, one embodiment of a valve gate assembly 10, according to the present invention, is shown for a manifold assembly, generally indicated at 12, and a mold, generally indicated at 14. The mold 14 has a first mold half 15 and a second mold half (not shown) defining a cavity 16 therein. The mold 14 also has at least one, preferably a plurality of openings 18 extending through the first mold half 15 and fluidly communicating with the cavity 16. It should be appreciated that, when a molten material (not shown) is introduced into the cavity 16 via the openings 18, the mold 14 contains the molten material, and when the molten material hardens or cures, it holds a shape similar to that of the cavity 16. It should also be appreciated that the mold 14 is conventional and known in the art.

The manifold assembly 12 includes a manifold 20 having a manifold flow passage 22. The manifold assembly 12 also includes at least one, preferably a plurality of nozzles 24 extending downwardly from the manifold 20 and having a nozzle flow passage 26 fluidly communicating with the manifold flow passage 22. The manifold assembly 12 further includes a sprue 28 extending radially outward from the manifold 20 for facilitating the introduction of molten material into the manifold 20. The flow passages 22 and 26 can be of any appropriate shape. The nozzle flow passage 26 narrows and terminates at a gate 30. As illustrated in FIG. 1, the mold 14 is positioned such that the gate 30 is positioned adjacent a respective opening 18 of the mold 14 to allow the nozzle flow passage 26 to be in fluid communication with the cavity 16. The valve gate assembly 10 cooperates with the gate 30 of the manifold assembly 12 to control the flow of molten material from the manifold assembly 12 to the mold 14. It should be appreciated that, although more than one valve gate assembly 10 may be used with the manifold assembly 12, only one valve gate assembly 10 is used with one gate 30 of the manifold assembly 12. It should also be appreciated that the molten material may be of a plastic, metal, wood fibers and plastic, etc. and is injected into the sprue 28 of the manifold assembly 20 from a molding machine (not shown). It should further be appreciated that the manifold assembly 12 is conventional and known in the art.

The valve gate assembly 10, according to the present invention, includes a moveable valve, generally indicated at 31, for regulating the flow of molten material into the cavity 16 of the mold 14. In one embodiment, the valve 31 is a pin or rod-like member 32 cooperating with the gate 30 to regulate the flow of molten material into the cavity 16 of the mold 14. In the embodiment illustrated, the pin 32 is axially aligned with the gate 30 and is at least partially disposed within the nozzle flow passage 26. The cross section of the pin 32 is preferably smaller than the cross section of the flow passage 26 such that the molten material may flow around the pin 32. The pin 32 includes an end 34 that opens and closes the gate 30 in a manner to be described. It should also be appreciated that the pin 32 is conventional and known in the art.

The pin 32 can move axially within the flow passage 26 toward and away from the gate 30 in a manner to be described. The pin 32 can be positioned in a fully open position (i.e., at the top of its stroke), wherein its end 34 is positioned away from the gate 30. The pin 32 can also be positioned in a fully closed position (i.e., at the bottom of its stroke), wherein its end 34 is positioned within the gate 30. Preferably, the size of the end 34 is complementary to that of the gate 30, allowing the end 34 to block and substantially seal the gate 30 when the pin 32 is in its fully closed position. As such, when the pin 32 is in the fully closed position, it seals the gate 30 and molten material will not flow therethrough. When the pin 32 is in the fully open position, molten material will flow through the gate 30 into the mold 14. It should be appreciated that the pin 32 can move between the fully closed and fully open positions and can be stopped at any position therebetween in a manner to be described. It should also be appreciated that the molten material flow through the gate 30 increases as the pin 32 moves from the fully closed position to the fully opened position.

The valve gate assembly 10 also includes an actuating system 36, according to the present invention, operatively cooperating with the pin 32 for moving the pin 32 between the fully closed and fully open positions. In the embodiment illustrated in FIG. 2, the actuating system 36 includes an actuator 38 operatively attached to the pin 32. The actuator 38 axially or linearly moves the pin 32 away and toward the gate 30. The actuator 38 can infinitely position the pin 32 between the fully closed and fully open positions, meaning that the pin 32 can come to rest at the fully closed position, the fully open position, and anywhere in between. In one embodiment, the entire range of movement (i.e., stroke) of the pin 32 between the fully closed and fully open positions is approximately one inch. This infinite movement can occur incrementally. For example, in one embodiment, the actuator 38 incrementally moves the pin 32 a predetermined amount such as approximately 0.001 inch increments. By axially moving the pin 32, the actuating system 36 can seal and unseal the gate 30 as discussed in greater detail below. It should be appreciated that the actuator 38 may be a linear motor, brushless direct current (DC) motor, linear synchronous motor, linear drive, linear servo, or linear tubular motor or actuator for changing rotary motion to linear actuation of the pin 32. Additionally, a transmission assembly which translates relative rotation between two members into linear motion is preferably utilized in the present invention. Also, gear reduction transmission such as planetary gear systems or the like are within the scope of the present invention providing infinite movement. It should also be appreciated that the actuator 38 may be of an electromagnetic, earth magnetic, or electric type. It should further be appreciated that, as the increment becomes smaller, the positioning or movement of the pin 32 becomes infinite.

Figure 2:
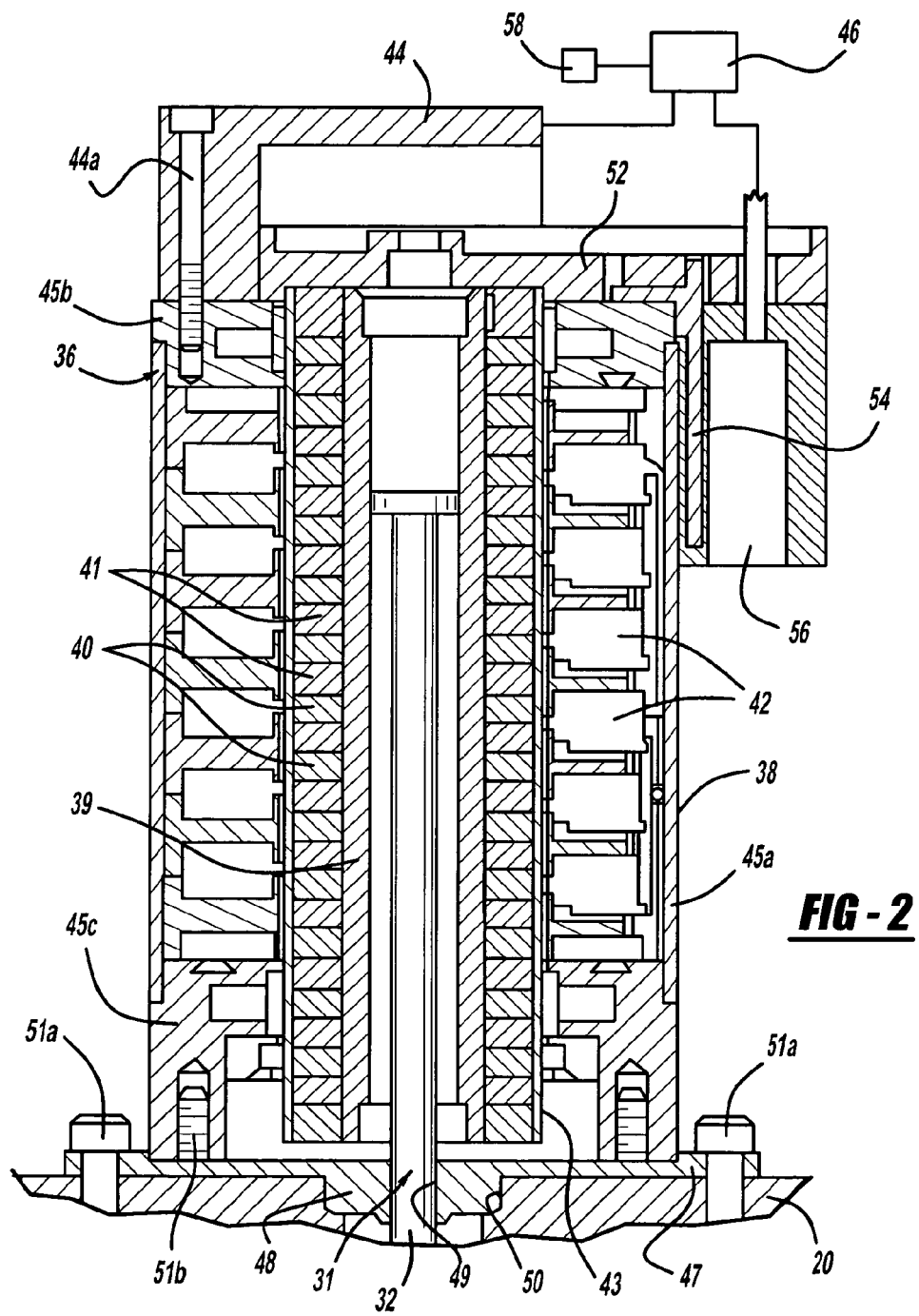
FIG. 2 is an elevational view of one embodiment of an actuating system, according to the present invention, of the valve gate assembly of FIG. 1.

In the embodiment shown in FIG. 2, the actuator 38 is of a linear induction motor type. The actuator 38 includes a core 39 disposed about and connected to the pin 32 at an upper end thereof. The actuator 38 also includes at least one, preferably a plurality of permanent magnets 40 disposed axially and circumferentially about the core 39. The permanent magnets 40 are axially spaced by non-magnetic insulating members 41 disposed axially and circumferentially about the core 39. The actuator 38 includes a cylindrical housing 43 disposed about the permanent magnets 40 and the insulating members 41. It should be appreciated that the pin 32, core 39, permanent magnets 40, insulating members 41, and housing 43 move as a single unit.

The actuator 38 includes at least one, preferably a plurality of electromagnets 42 spaced axially and disposed circumferentially about the permanent magnets 40. The actuator 38 also includes an electrical connector 44 electrically connected to the electromagnets 42 and a source of power such as a controller 46 to be described. The actuator 38 includes a cylindrical housing 45a disposed about the electromagnets 42 and an upper end plate 45b closing one end of the housing 45a and a lower end plate 45c closing the other end of the housing 45a. The electrical connector 44 is connected to the upper end plate 45b by suitable means such as a fastener 44a. It should also be appreciated that, when the electromagnets 42 are in the correct position relative to the permanent magnets 40, the electromagnets 42 are energized by the controller 46 and repel the permanent magnets 40 to move the core 39 and pin 32 linearly.

The actuator 38 includes a plate 47 at a lower end for attachment to the manifold 20. The plate 47 has a locator 48 extending axially therefrom for locating the plate 47 relative to the manifold 20. The locator 48 has an aperture 49 extending axially therethrough through which the pin 32 extends. The locator 48 is located in a recess 50 of the manifold 20 and the plate 47 is attached to the manifold 20 by suitable means such as fasteners 51a. The plate 47 is attached to the lower end plate 45c by suitable means such as fasteners 51b. The actuator 38 includes a moveable plate 52 at an upper end thereof. The plate 52 is attached to the upper end of the pin 32. It should be appreciated that the electromagnets 42 and plate 47 are fixed relative to the manifold 20.

The actuating system 36 also includes an encoder 54. The encoder 54 may be of any appropriate type, including linear and rotary encoders. The encoder 54 may employ any appropriate position sensing mechanism. In one embodiment, the encoder 54 includes a sensing device 56 such as a photodetector. The encoder 54 is attached to the movable plate 52 such that the encoder 54 travels with the pin 32. Also, the sensing mechanism 56 is fixedly attached to the actuator 38 and disposed parallel to the travel of the pin 32. As such, when the pin 32 moves, the encoder 54 moves relative to the sensing mechanism 56 and detects the change in position as the encoder 54 travels linearly. The sensing device 56 translates the change in position (i.e., the position of the pin 32) to an electronic encoder signal. It should be appreciated that the sensing device 56 is electrically connected to the controller 46 to be described.

The actuating system 40 further includes a controller 46 electrically connected to the sensing device 56 and the actuator 38. The controller 46 receives the encoder signals and translates these encoder signals into a control signal. The controller 46 sends these control signals to the actuator 38 to energize and deenergize the electromagnets 42 of the actuator 38, thereby causing the actuator 38 to move the pin 32 toward or away from the gate 30. It should be appreciated that the controller 46 may be any suitable type of computer, for example, a personal computer (PC) or a programmable logic controller (PLC).

The valve gate assembly 10 includes an input device 58, such as a keyboard, electrically connected to the controller 46. With the input device 58, a user can manually input information to the controller 46, such as the desired position of the pin 32.

In operation, the molding process can begin with the pin 32 in the fully closed position such that the molten material in the manifold assembly 12 is prevented from flowing into the cavity 16 of the mold 14. When it is determined to allow molten material into the cavity 16 of the mold 14, the controller 46 sends control signals to the actuator 38 to energize and de-energize the electromagnets 42 to repel the permanent magnets 40 and move them linearly, which actuates the pin 32 and moves the end 34 of the pin 32 linearly away from the gate 30. The sensing mechanism 56 detects the change in position of the pin 32 via the encoder 54, and feeds back encoder signals to the controller 46. When the pin 32 reaches the desired position, the controller 46 receives the corresponding encoder signals and the controller 46 stops sending control signals to the actuator 38, thereby stopping the actuator 38 from actuating. When the pin 32 is in the desired open position, the molten material flows through the passageway 26 and gate 30 and into the cavity 16 of the mold 14. It should be appreciated that the actuator 38 can infinitely position the pin 32 anywhere between the fully closed and fully open positions and allows for quick and accurate adjustment of the flow of molten material into the cavity 16 of the mold 14.

Figure 3:
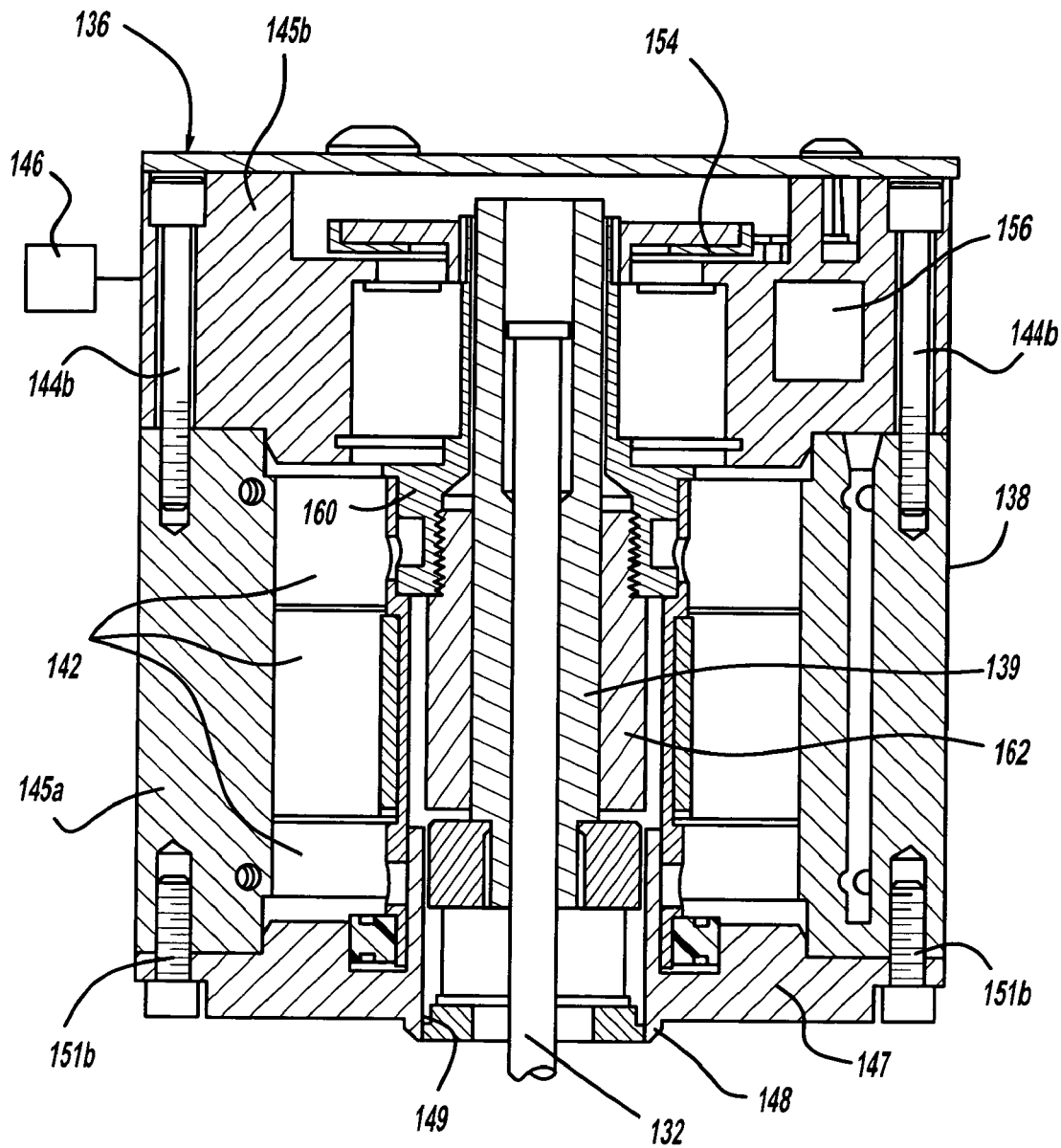
FIG. 3 is an elevational view of another embodiment of an actuating system, according to the present invention, of the valve gate assembly of FIG. 1.

Referring to FIG. 3, another embodiment, according to the present invention, of the actuating system 36 is shown. Like parts of the actuating system 36 have like reference numerals increased by one hundred (100). In this embodiment, the actuating system 136 includes the actuator 138 operatively attached to the pin 132. The actuator 138 is of a linear motor type. The actuator 138 includes a core 139 disposed about and connected to the pin 132 at an upper end thereof. The actuator 138 includes a rotatable nut 160 and a hollow ball screw 162 connected to the core 139 and threadably engaged with the nut 160 for cooperating with the nut 160. The actuator 138 also includes at least one, preferably a plurality of electromagnets 142 spaced axially and disposed circumferentially about the core 139. The actuator 138 also includes an electrical connector (not shown) electrically connected to the electromagnets 142 and a source of power such as a controller 146. The actuator 138 includes a cylindrical housing 145a disposed about the electromagnets 142 and an upper end plate 145b closing the upper end of the housing 145a. The upper end plate 145b is connected to the housing 145a by suitable means such as fasteners 144b.

The actuator 138 includes a plate 147 at a lower end for attachment to the manifold 20. The plate 147 has a locator 148 extending axially therefrom for locating the plate 147 relative to the manifold 20. The locator 148 has an aperture 149 extending axially therethrough through which the pin 132 extends. The plate 147 is attached to the housing 145a by suitable means such as fasteners 151b.

The actuating system 136 also includes an encoder 154. The encoder 154 is a rotary encoder. The encoder 154 includes a sensing device 156 such as a photodetector. The encoder 154 is attached to the rotatable nut 160. Also, the sensing mechanism 156 is fixedly attached to the actuator 138. As such, when the nut 160 rotates and the pin 132 moves, the encoder 154 moves relative to the sensing mechanism 156 and detects the change in position as the encoder 154 rotates. The sensing device 156 translates the change in position (i.e., the position of the pin 132) to an electronic encoder signal. It should be appreciated that the sensing device 156 is electrically connected to the controller 146.

In operation, the molding process can begin with the pin 132 in a fully closed position such that molten material in the manifold assembly 12 is prevented from flowing into the cavity 16 of the mold 14. When it is determined to allow molten material into the cavity 16 of the mold 14, the controller 146 sends control signals to the actuator 138 to energize and de-energize the electromagnets 142 to rotate the nut 160. Rotation of the nut 160 moves the ball screw 162 linearly, which actuates the pin 132 and moves the end 134 of the pin 132 linearly away from the gate 30. The sensing mechanism 156 detects the change in position of the pin 132 via the encoder 154, and feeds back encoder signals to the controller 146. When the pin 132 reaches the desired position, the controller 146 receives the corresponding encoder signals and the controller 146 stops sending control signals to the actuator 138, thereby stopping the actuator 138 from actuating. When the pin 132 is in the desired open position, the molten material flows through the passageway 26 and gate 30 and into the cavity 16 of the mold 14.

Accordingly, the valve gate assembly 10 provides the user with more control during the molding process by allowing the pin 32, 132 position to be infinitely adjusted. For example, a molding process may be working effectively; however, environmental changes or wear in the mold might render that process less effective. The valve gate assembly 10 of the present invention allows the user to make changes to the process (i.e., changes in pin position or actuation timing), thereby maintaining the production of quality parts.

Figure 4:
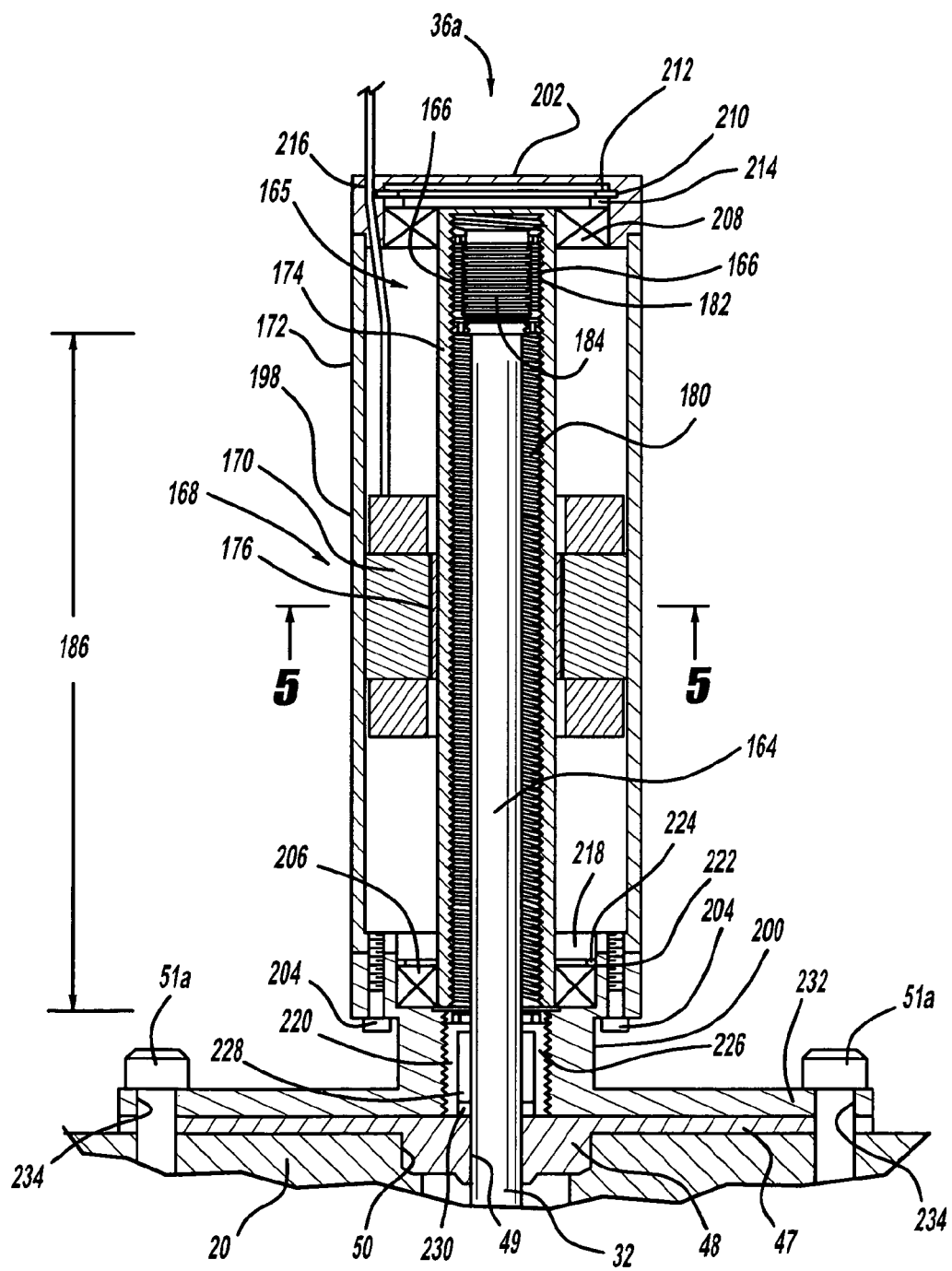
FIG. 4 is a sectional view along the axial length of an alternate embodiment of an actuator assembly in accordance with the present invention.
Figure 5:
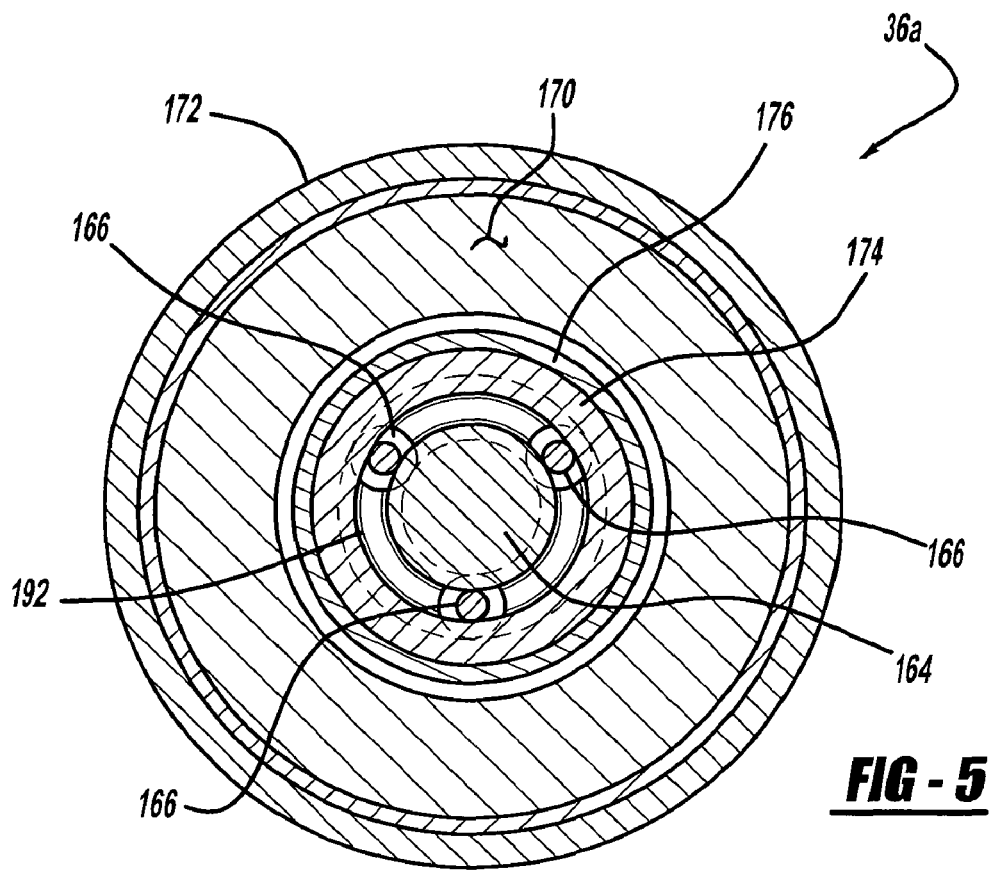
FIG. 5 is a sectional view taken along line 5-5 of FIG. 4.
Figure 6:
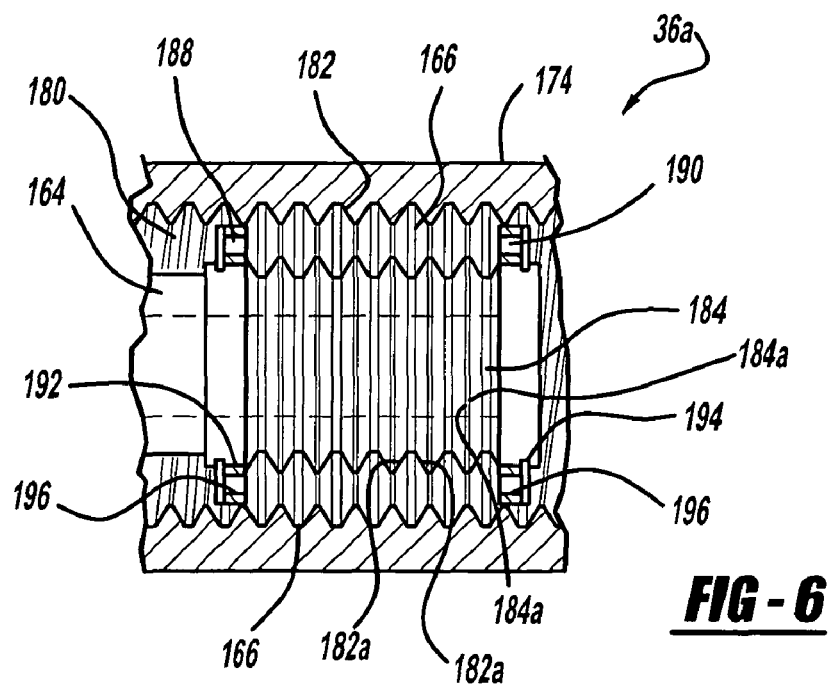
FIG. 6 is an enlarged detailed view of a portion of FIG. 4.

Another embodiment of an actuator assembly 36a in accordance with the present invention is shown in FIGS. 4-6. The actuator assembly 36a includes a portion of the pin 32 which extends into the actuator assembly 36a to function as an output shaft 164. A transmission assembly, generally indicated at 165, is provided for transmitting relative rotation between the output shaft 164 and the housing 172 into linear motion of the output shaft. The transmission assembly 165 includes a plurality of transmission rollers 166. The actuator assembly 36a also includes an electric motor assembly 168 (including a stator 170), and a housing assembly 172. The motor assembly 168 moves the output shaft 164, by way of the transmission assembly 165, into a pre-selected position, between a retracted position (shown in FIG. 4) and an extended position (not shown). The motor assembly includes an elongated cylinder 174 formed of a magnetic material rotatably supported relative to the housing assembly 172. Magnets 176 are mounted about an outer surface of the cylinder 174 to form an armature (with the cylinder 174) within the motor assembly 168. The stator 170 is attached to and supported by the housing assembly 172 and encircles the cylinder 174. An external control wire 178, which is connected to an external controller (not shown) of any known type, selectively energizes the stator 170 to rotate the armature (clockwise or counterclockwise).

The transmission assembly is provided by the elongated cylinder 174 which includes a central threaded bore 180. The threads of bore 180 are engaged by the transmission rollers 166. The output shaft 164 is coupled with the transmission rollers 166 by way of the annular rings 182 of the transmission rollers engaging a series of corresponding annular grooves 184 in the output shaft 164. The transmission rollers engages threaded bore 180 and annular grooves 184 to move along threaded bore 180 during rotation of the cylinder 174. Thus, the elongated cylinder 174 forms a drive cylinder within the actuator assembly 36 as well as forming the armature of the motor assembly 168. Accordingly, the elongated cylinder 174 is referred to herein as the armature drive cylinder.

The output shaft 164 and the transmission rollers 166 are axially aligned within the threaded bore 180 of the armature drive cylinder 174. The transmission rollers 166 are spaced around a portion of the output shaft 164 (see FIG. 5) and include a plurality of annular ribs, rings 182 which extend axially along the length of each roller (see FIG. 6), preferably, at a peripheral end thereof. The rings 182 define camming surfaces 182a which are engaged by the threaded bore 180 of the armature drive cylinder 174 to move the output shaft 164 along the threaded bore 180 in response to the rotation of the armature drive cylinder 174. The length of the threaded bore 180 within the armature drive cylinder 174 defines a track along which the transmission rollers 166 of the actuator assembly 36a move.

As set forth below, a portion of the output shaft 164 includes a camming surface 184a shown in the form of corresponding annular grooves 184 which are engaged by the annular rings 182 and camming surfaces 182a of the transmission rollers 166 to advance the output shaft 164. Thus, as described, when the armature drive cylinder 174 is selectively rotated (clockwise or counterclockwise) by the stator 170, the threaded bore 180 engages the transmission rollers 166 to selectively move the transmission rollers 166 along the threaded bore 180 of the armature drive cylinder 174. The annular rings 182 of the transmission rollers 166 engages the annular groove 184 and camming surfaces 184a of the output shaft 164 to move the output shaft 164.

The thread engaging portion of the actuator assembly 36a (as defined by the annular rings 182 of the transmission rollers 166) is significantly shorter than the extent of the internal threads of the threaded bore 180 within the armature drive cylinder 174 such that the difference between them defines a maximum actuation stroke 186. Since the extent of the thread engaging portion (annular rings 182 of the transmission rollers 166) is significantly small as compared to the extent of the threads within the armature drive cylinder 174 and since the motor assembly is positioned around the output shaft 164, the length of the cylinder 174 closely approximates the maximum extent of the actuation stroke 186 and the length of the actuator assembly 36. Also, the thread engaging portion (annular rings 182 of the transmission rollers 166) and the annular rings 184 of the actuator assembly 36a are maintained within the armature drive cylinder 174 during the entire actuation stroke 186. Thus, the interactive parts of the actuator assembly 36a are self-protected during the entire stroke of the output shaft 164. In addition, since only a "smooth" portion of the output shaft 164 which terminates into the pin 32 extends outside the threaded bore 180, a forward end of the bore 180 can be easily sealed to define a protected chamber for the interacting elements of the device.

As illustrated in FIG. 5, at least three transmission rollers 166 are used. The transmission rollers 166 are mounted for rotation about the output shaft 164 and include forward and rear support axle extensions 188 and 190 which cooperate with forward and rear support rings 192 and 194, respectively (FIGS. 5 and 6). Each of the forward and rear support rings 192 and 194 include support holes 196 which accept one of the extensions 188, 190. The number of support holes 196 on each of the forward and rear support rings 192 and 194 corresponds to the number of transmission rollers 166. The forward support axle extensions 188 of each of the transmission rollers 166 extend through a support hole 196 of the forward support ring 192. Likewise, the rear support axles 190 of each of the transmission rollers 166 extend through a support hole 196 of the rear support ring 194. Thus, the forward and rear support rings 192 and 194 maintain the spacing of the transmission rollers 166 about the output shaft 164 during operation. The axle extensions 188 and 190 are secured within the holes 196 of support rings 192 and 194 in any known manner.

As shown in FIG. 4, the housing assembly 172 includes a cylindrical tube 198, an end cap 200, and a circular end seal 202. The end cap 200 is mounted to a first end of the cylindrical tube 198 by bolts 204 and the circular end seal 202 is mounted to a second end of the cylindrical tube 198, as by a proper fit.

The stator 170 of the motor assembly 168 is mounted about an inner surface of the cylindrical tube 198. The armature drive cylinder 174 is rotationally supported relative to the housing assembly 172 by front and rear bearings 206 and 208, respectively. The rear support bearing 208 is mounted to an internal surface of the circular end seal 202 to rotationally support a rear portion of the armature drive cylinder 174. The circular end seal 202 includes a circumferential groove 210 within which is maintained a retaining ring 212. A bumper 214 is interposed and held in place between the retaining ring 212 and the bearing 208 to absorb energy when the actuator assembly 36a reaches the retracted position at the rear end of the threaded bore 56 thereof. The circular end seal 208 includes a wire opening 216 for electrically connecting the external control 178 to the stator 170.

The end cap 200 is formed as a stepped cylindrical member having a stepped central bore defining a first bore portion 218 and a second bore portion 220, the diameter of the first bore portion 218 being larger than the diameter of the second bore portion 220. The front bearing 206 is mounted within the first bore portion 218 of the end cap 200 to rotationally support a front portion of the armature drive cylinder 174. The end cap 200 includes a circumferential groove 222 which maintains a front retainer ring 224 to secure the front bearing 206 relative to the housing assembly 172.

The second bore portion 220 of the end cap 200 is internally threaded. An externally threaded tubular bushing support 226 is seated within the internally threaded second bore portion 220 of the end cap 200. The bushing 228 is concentrically positioned within the bushing support 226 to support the output shaft 164 at a forward (output) end of the housing assembly 172. A ring seal 230 is included at a forward end of the bushing 228. The end cap 200 includes a flange portion 232 having screw holes 234 for attachment to the manifold 20. The screw holes 234 are used for receiving fasteners 51a for fastening the flange portion 232 along with the plate 47 to the manifold 20. Once again, the locator 48 is located in the recess 50 of the manifold 20, correctly positioning the actuating assembly 36

Figure 7:
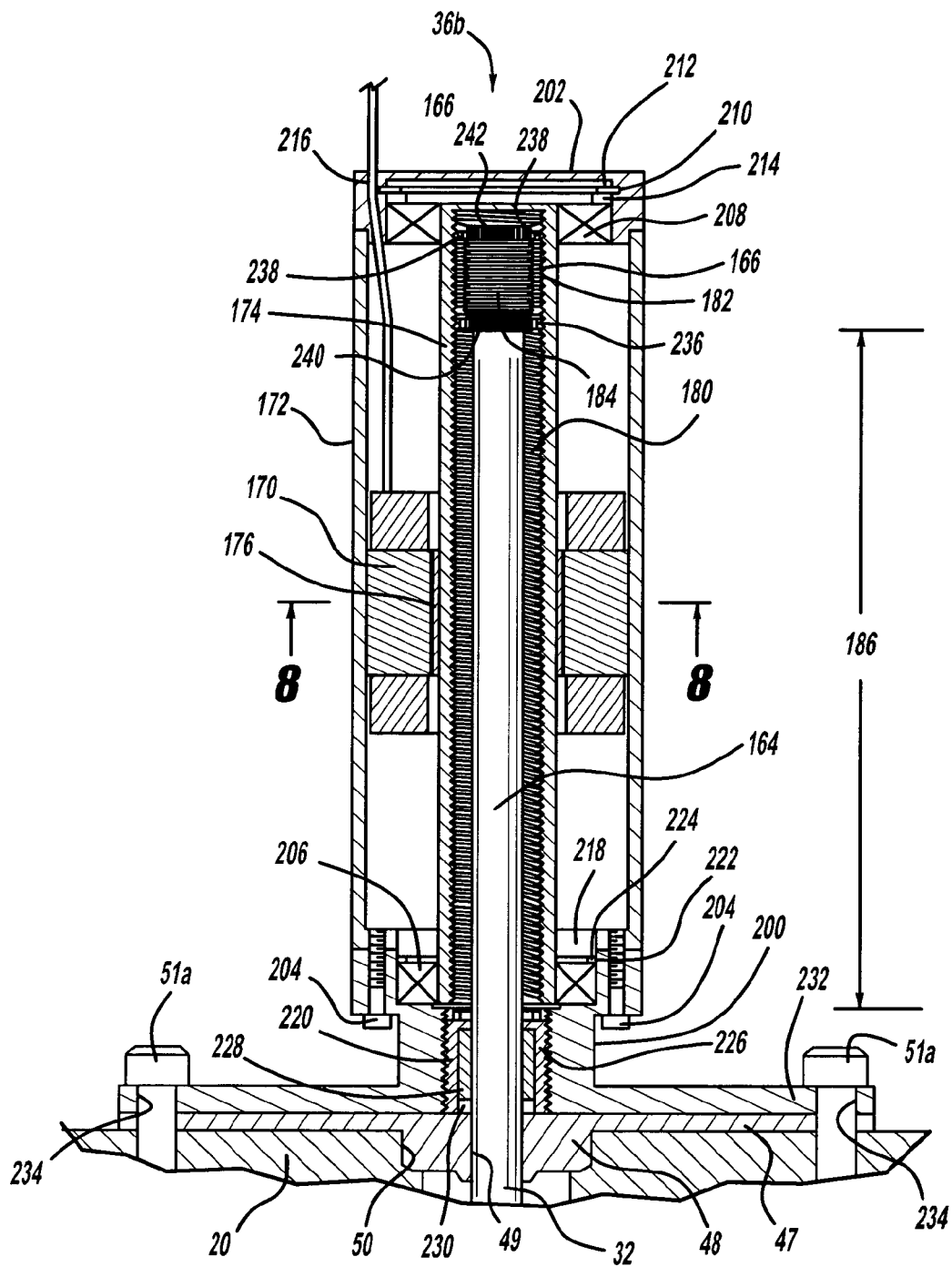
FIG. 7 is a sectional view along the length of another alternate embodiment of an actuator assembly in accordance with the present invention.
Figure 8:
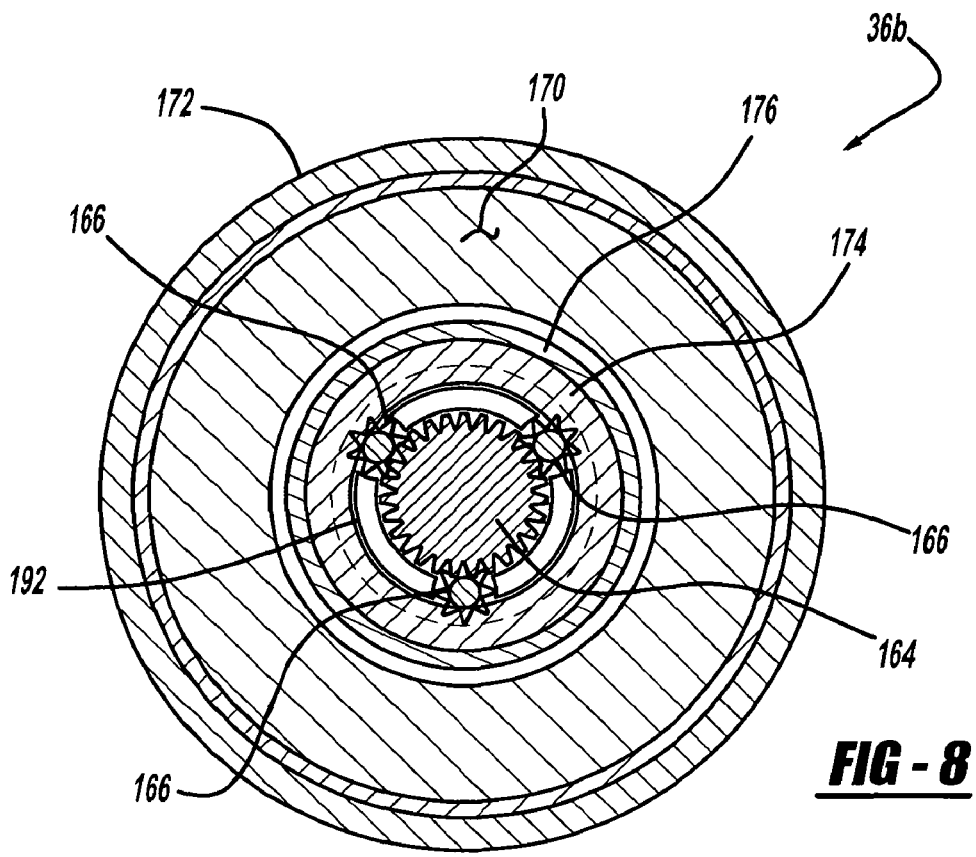
FIG. 8 is a sectional view taken along line 8-8 of FIG. 7.
Figure 9:
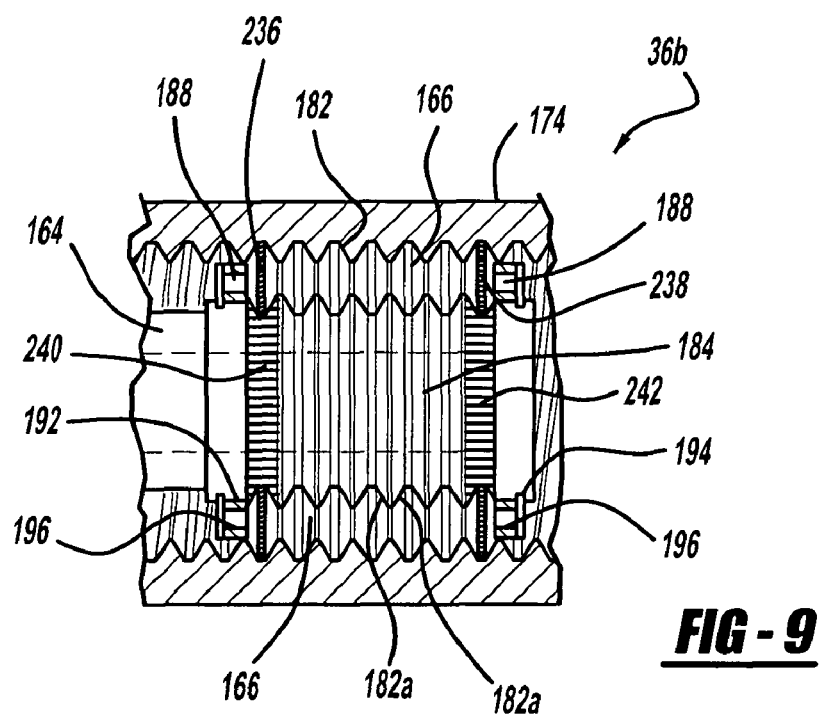
FIG. 9 is an enlarged detailed view of a portion of FIG. 7.

FIGS. 7-9 illustrate another preferred embodiment of a linear actuator assembly 36b in accordance with the present invention. As shown, in FIGS. 7-9, the linear actuator 36b is similar to the embodiment described in FIGS. 4-6, and has many of the same components. The reference numbers used in FIGS. 4-6 are used to identify like components in FIGS. 7-9. As shown in FIGS. 7-9, actuator assembly 36b differs from the embodiment of FIGS. 4-6 in that the transmission rollers 166 of the actuator assembly 36b include forward and rear gear teeth 236 and 238. Further, the output shaft 164 (about which the transmission rollers 166 are positioned) includes forward and rear gear teeth 240 and 242, respectively. The forward and rear gear teeth 236 and 238 of the transmission rollers 166 mesh with the respective forward and rear gear teeth 240 and 242 of the output shaft 164 to maintain the relative position of the rollers 166 while the output shaft 164 moves along the threaded bore 180 of the armature drive cylinder 174. The interaction of the gear teeth 236, 238 of the transmission rollers 166 and the gear teeth 240, 242 of the output shaft 164 prevents slippage therebetween.

Figure 10:
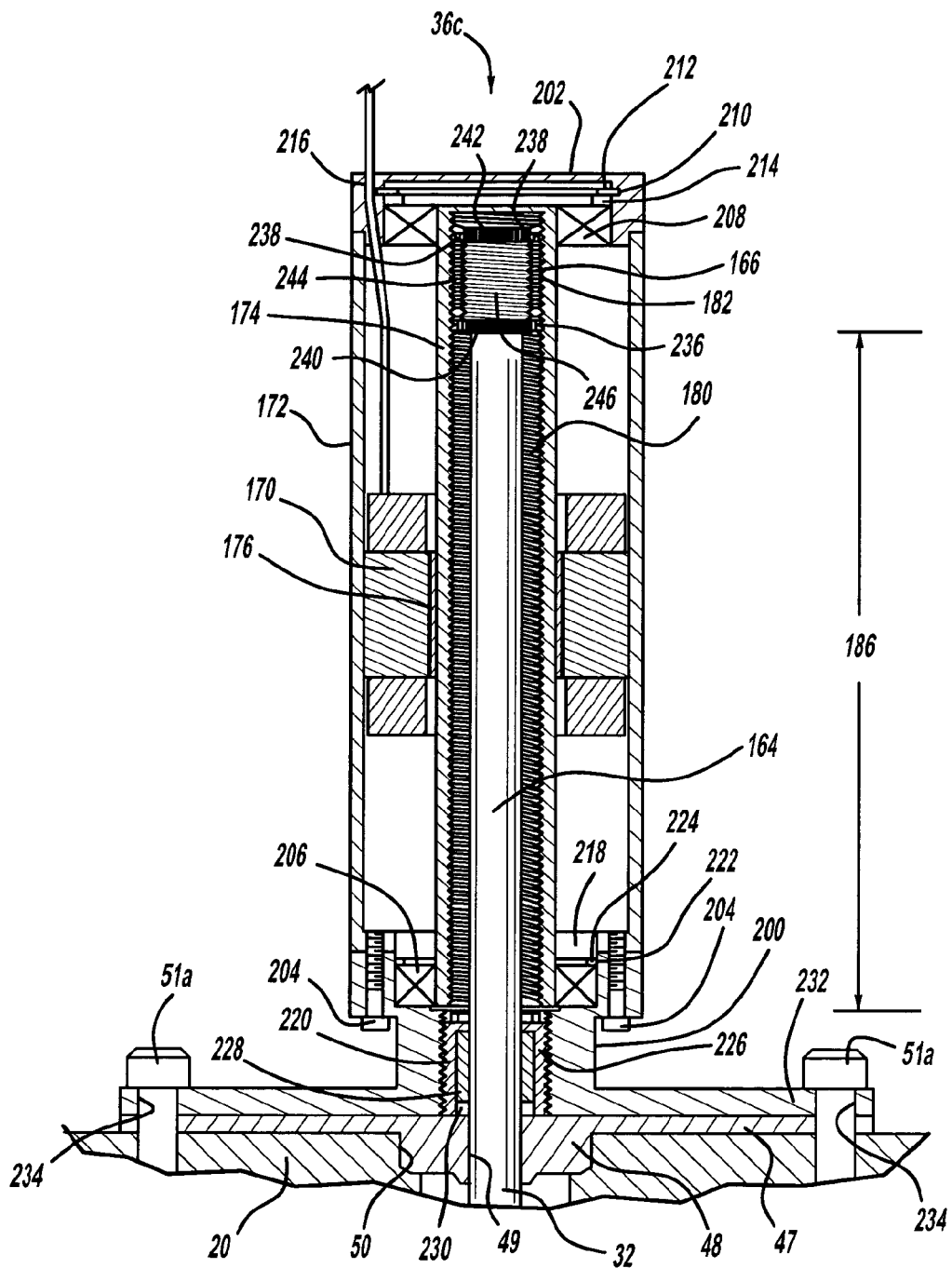
FIG. 10 is a sectional view along the linear axial length of another embodiment of an actuator assembly in accordance with the present invention.
Figure 11:
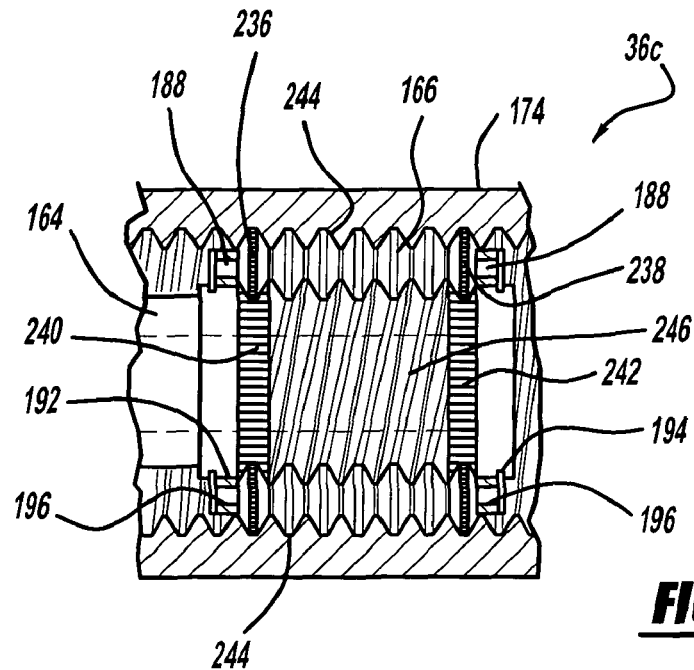
FIG. 11 is an enlarged detailed view of a portion of FIG. 10.

FIGS. 10 and 11 illustrate a further embodiment of the actuator assembly 36c in accordance with the present invention. The actuator assembly 36c is similar to the embodiment shown in FIGS. 7-9, and, as such, like numbers have been used to identify like parts. However, in the actuator assembly 36c of FIGS. 10 and 11, the camming surfaces of the transmission rollers 166 are defined by threads 244 instead of annular rings as shown in the embodiments shown in FIGS. 4-9. Likewise, the portion of the output shaft 164 (about which the transmission rollers 166 are spaced) includes threads 246 instead of annular rings as in the embodiments of FIGS. 4-9 which are engaged by the threads 244 of the transmission rollers 166. In operation, the threads of the bore 180 of the armature drive cylinder 174 engage the threads 244 of the transmission rollers 166 to move the transmission rollers 166 on rotation of the cylinder 174. The threads 244 of the transmission rollers 166 likewise engage the threads 246 of the output shaft 164 to correspondingly move the output shaft 164 in cooperation with the transmission rollers 166.

It will be appreciated by those skilled in the art that an objective of the actuator assemblies 36a,36b,36c,36d is to precisely apply linear motion to some object or mechanism for controlling the valve gate openings 18. The motion is generally programmed or defined in a computer program developed by the user of the actuator assembly 36a,36b,36c, 36d. For example, prior to using the actuator assembly 36a, 36b,36c,36d, the user enters the instructions and motion profiles into a programmable motion controller. The motion controller, when commanded, executes the user's program by signaling a servo amplifier to apply a voltage across the actuator's stator leads. The level of voltage applied is a function of the velocity specified in the user's program for the specific move being executed. The voltage causes current to flow in the stator windings of the actuator assembly 36a,36b,36c,36d which, in turn, applies a torque to the motor armature. In the actuator assembly 36a,36b,36c,36d, the subsequent rotation of the armature is converted mechanically within the actuator assembly 36a,36b,36c,36d to a linear motion reflected on the output shaft 164.

Specific instructions for both instantaneous position and velocity are transmitted by the motion controller for each move executed. In response, the amplifier applies a voltage level which represents an expected velocity output of the actuator. The expected voltage/velocity relationship is established by the user during setup and calibration of the system. Thus, typically the pin 32 position with respect to the gate 30 can be precisely controlled via pre-calibration. Thus, it is not necessary for closed loop control to be used in the present invention. In certain situations, the actual velocity of the output shaft 164 may not exactly match what is being commanded by the motion controller. If desired, the actual movement of the actuator output shaft can be monitored to assure that the actuator produces the exact motion desired. In such a situation, a closed loop feed back control can be used in an alternate embodiment.

In the present invention, this is accomplished by first incorporating a velocity/position feedback sensor 248 within the actuator assembly 36d (best seen in FIG. 13) and second, by designing the servo amplifier 250 and the controller 252 (best seen in FIG. 12) such that continuous adjustments are made to the voltage applied in response to any sensed error in position and/or velocity. By doing so, continual adjustment of the system command is accomplished such that the motion produced is exactly as intended by the user. For example, if the actuator assembly's 36d output during a particular movement is 0.100 inches behind the target position at that moment and/or it is moving too slow relative to the instructions in the user program, then the voltage will be increased slightly to increase its speed (i.e., the controller 252 attempts to eliminate the gap between the target and actual values).

The controller 252 must receive information as to the velocity and the position of the actuator assembly's 36d output shaft 164 at all times. A previous method of deriving this information was to utilize a linear position sensor. Such sensors exist in many forms and include potentiometers, LVDTs or magnostrictive types. While the accuracy of the feedback sensor may vary without affecting control, the velocity feedback must be continuous and linear with respect to the voltage applied in order for the system to operate correctly. Likewise, the relationship between the armature's movement and the sensed position must be continuous and linear to operate correctly. However, in any screw style rotary-to-linear conversion mechanism a small amount of backlash exists, introducing error in these systems.

Backlash results from the fact that no mechanism can be manufactured where all the components mesh or fit perfectly (i.e., tolerances are near or are zero). Even if the components could fit perfectly, and even assuming minimal wear, backlash would evolve. In the present case, it will be appreciated that backlash causes a non-linearity or discontinuity in the above described relationships at that point where the torque being applied to the armature changes direction.

Any discontinuity in these relationships will confuse the controller to the extent that instability or oscillation will occur. Therefore, the point at which the greatest precision and highest stability is normally desired is also exactly the point where instability will most likely occur. More specifically, the motor servo-controller must accurately hold the desired output shaft position by applying forward or reverse movement or force in response to any sensed movement from the desired position. However, due to the tolerances that backlash creates there is a discontinuity between the application of forward and reverse movement. As a result, the controller causes the linear actuator to hunt, or oscillate, back and forth in an attempt to maintain it in a final target position.

One approach to solving this problem is to eliminate backlash. This might be done by splitting one or more of the roller screw components in half, and then preloading the pieces against each other by an adjustable spring mechanism. If this approach is utilized, it will be appreciated that the spring tension must then exceed the actuator's load capacity.

However, such an approach is expensive and takes up additional space. Further, only half of the screw mechanism carries the load. While this approach can be made to work, the additional friction resulting from the high forces applied substantially reduces the system's efficiency—thereby increasing its power consumption thus reducing the life of the unit correspondingly.

Turning to the present invention, since the position and velocity of the output shaft 164 is a known fixed ratio of the rotation of the armature, the preferred solution is to measure its rotational position and velocity and allow the motion controller 252 to calculate the resulting position of the actuator assembly's 36 output shaft 164. While backlash will allow some back and forth movement of the output shaft 164, when the armature is held in position, no discontinuity between the voltage applied to the armature and feedback will occur. Therefore, in the preferred embodiment, the feedback sensor 248 is mounted directly and rigidly to the armature resulting in stable operation. Using this method, the amount of backlash must only be less than the system accuracy requirements of the application (i.e., the inaccuracy allowed must be greater than the total backlash of the converting mechanism).

Figure 12:
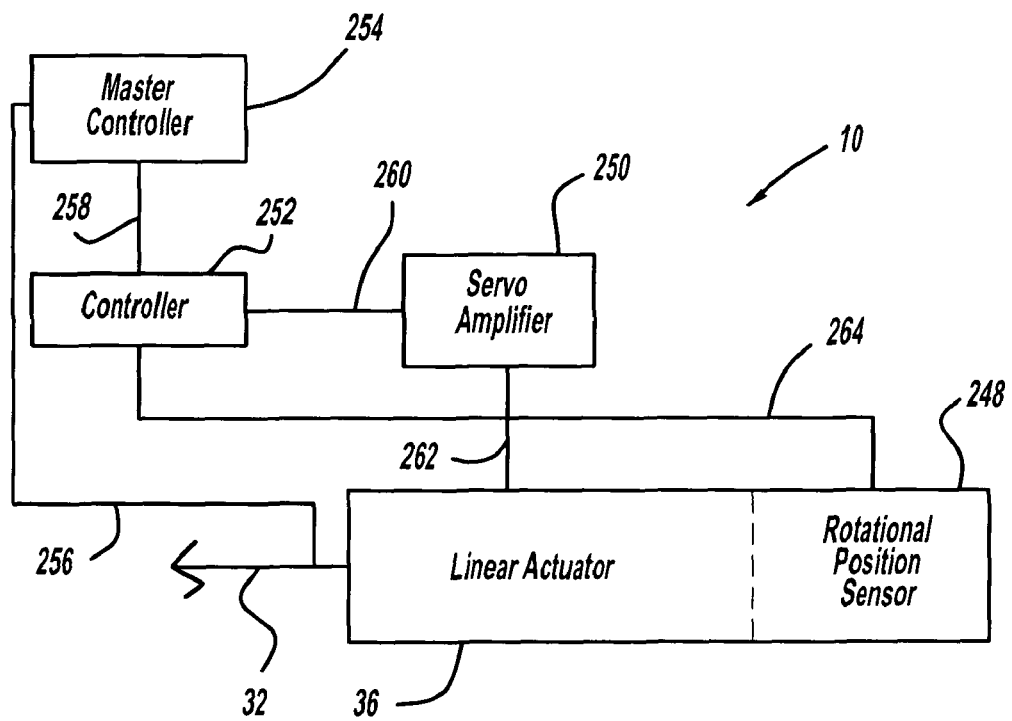
FIG. 12 is a functional block diagram of a preferred actuator assembly including a feedback position sensor constructed according to the principles of the present invention.
Figure 13:
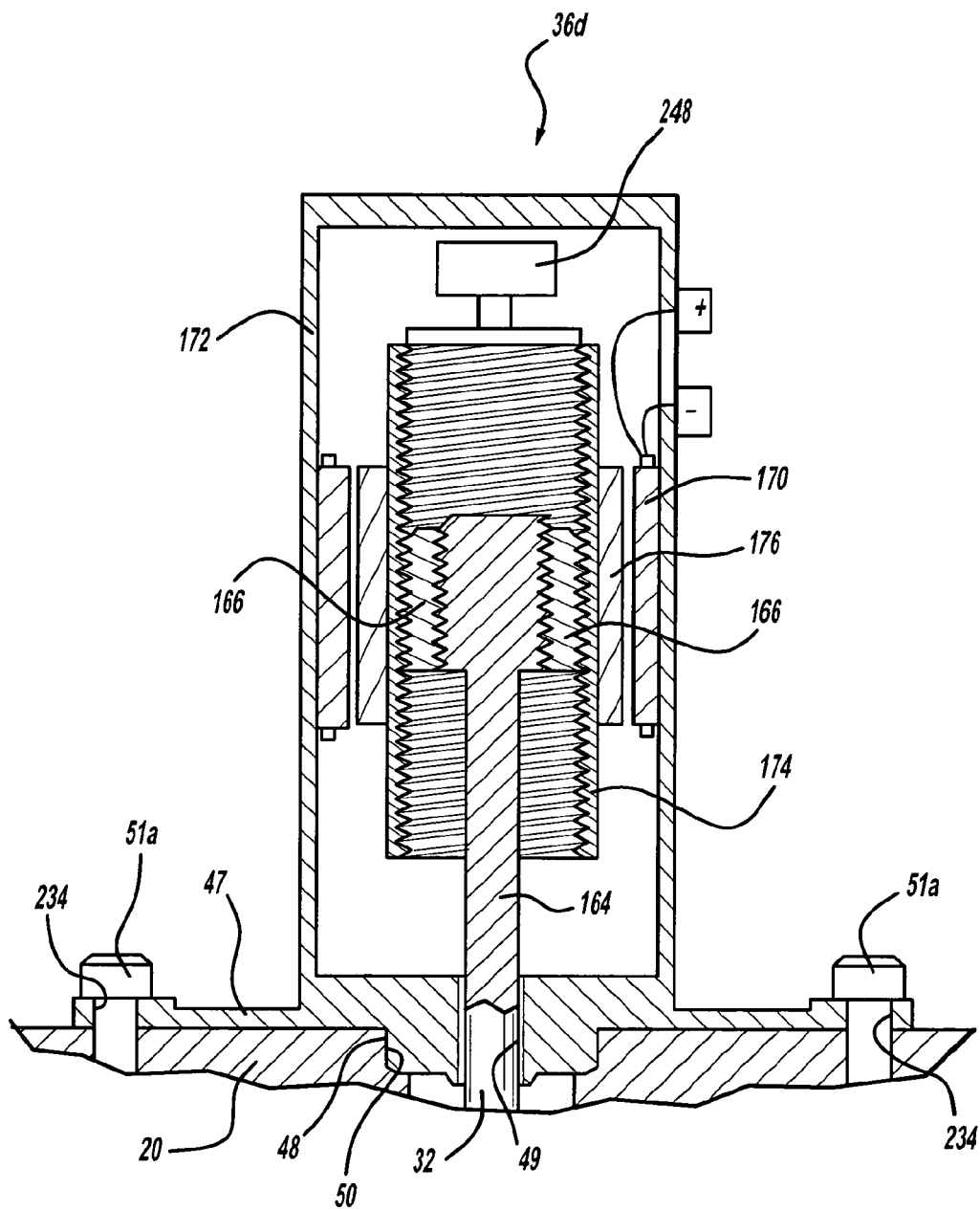
FIG. 13 is a sectional view taken along the axial length of an embodiment of an actuator assembly shown in FIG. 12.

In an alternate embodiment, a rotary position/velocity sensor is used as illustrated in FIG. 12. Advantages associated with use of such a rotary feedback compared to a linear sensor device are that it is generally less expensive; it is more rugged; it does not require expensive boring of the output shaft; it mounts conveniently at the rear end of the armature; and it can be used to provide commutation signals required for brushless motors. Alternatively, employing a linear sensor would require the use of a separate motor commutation sensor.

It will be appreciated that the system normally includes some form of a proportional, integral, derivative control process equation. However, those skilled in the art will appreciate that other control equations, such as proportional, proportional-derivative, fuzzy logic, etc. and other types of control devices may also be used. For a more detailed discussion, reference may be had to Dorf, Modern Control Systems, pages 379 et. seq. (1981). Control equation constants for the preferred embodiment of the present system control, may be derived empirically, and may be changed depending upon the desired application. Additionally, those skilled in the art will appreciate that the constants may also be derived by determination of the transfer function from the steady-state response or other such methods as are well known in the art.

By using the servo-amplifier 254 and controller 252, the linear positioning of the output shaft 164 may be properly and quickly maintained for predetermined target locations. As seen in FIG. 12, control is established by the angular position control of the rotary sensor 256 which is provided to the controller 252. The controller 252 operates in accordance with its programmed position control profile and other programming steps, and provides signals to the servo amplifier 254. In turn, the servo amplifier 254 provides the required voltage to the linear actuator stator 170.

In the preferred embodiment, the rotary sensor 256 is an optical digital encoder manufactured by Renco Corporation of California, under model designation RHS25D. Such devices generally operate by utilizing a light emitting device and a disk having a plurality of alternating optically transparent and opaque areas defined about the periphery. Thus, as the armature rotates, the light is alternatingly blocked and allowed to pass through the disk. A light sensitive device receives the light and provides a signal indicative of the light intensity received by the light sensitive device. It will be appreciated, however, that a light emitting device and a light receiving device together form an optical sensor, and that analog generators may also be utilized as part of the system.

One example of this type of system is shown in FIG. 12. As seen in FIG. 12, a valve gate assembly constructed in accordance with the principles of the present invention includes an actuator assembly 36 as described above and still includes the pin 32 as described above. This embodiment also includes a master controller device 254 receives signals from sensors (not shown) via the signal path 256 to positively confirm the pin 32 operation and/or the flow of fluid/materials to mold 14.

Through use of the system described above, as well as timing the movement of the pin 32 via master controller 254, the timing and programming of the entire valve gate assembly 10 may be controlled. For example, master controller 254 may provide instructions or interrupt signals to controller 252 via signal path 258. In turn controller 252 provides a signal to the servo amplifier 250 via signal path 260. This signal is preferably a signal as discussed above (i.e., the signal includes an output signal generated from the desired position of the output shaft compared to the position of the output shaft determined by rotational position sensor 248). The servo amplifier 250 provides the proper voltage to the linear actuator via signal path 262. It will be appreciated by those skilled in the art that the controller 252 and servo amplifier 250 comprise the external controller referenced above. The output signal of the rotational position sensor 248 is provided to the controller via signal path 264. In this manner, a precise delivery of fluid/materials is accomplished.

Although the present invention has been described with reference to preferred embodiments, workers skilled in the art will recognize that changes may be made in form and detail. For example, the output shaft "164" may be formed with rings or threads which directly engage the threads of the threaded bore 180 of the armature drive cylinder 174. Analog or digital sensors may be employed to detect the position of the output shaft, that information being used in control systems of known design. Also, other motor designs and types may be adapted to the practice of the present invention. These and other changes within the scope of the appended claims are anticipated by the present invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A valve gate assembly for an injection molding machine, comprising:
   a valve operably associated with a valve gate of an injection molding manifold;
   an actuator assembly operably coupled to said valve; and
   an axially movable output shaft in substantial axial alignment with said valve, said actuator assembly coupled to said axially moveable output shaft through a transmission assembly, such that said actuator assembly translates motion to said output shaft and said valve through the use of said transmission assembly for driving said valve and opening said valve gate, said actuator assembly operable for providing movement of said valve between an open position and a closed position, and stopping said valve at any position therebetween.

2. The valve gate assembly of claim 1, wherein said valve further comprises:
   at least one pin disposed within at least one flow passage at said valve gate, said at least one pin having an end disposed within said gate, and another end connected to said actuator assembly, said flow passage larger in diameter than said at least one pin; and
   wherein said output shaft of said actuator assembly selectively moves said pin in said flow passage to allow molten material through said gate into a mold cavity.

3. The valve gate assembly of claim 1, wherein said actuator assembly further comprises:
   an outer member comprising an elongated cylinder disposed within a housing, said elongated cylinder having a threaded bore and being made of a magnetic material and supported for rotation in said housing;
   a stator mounted in said housing, said stator circumscribing at least a portion of said elongated cylinder;
   at least one magnet disposed on said elongated cylinder, operably associated with said stator;
   a portion of said valve terminating into said output shaft, said output shaft disposed within said elongated cylinder, and a portion of said output shaft having a camming surface;
   said transmission assembly including a plurality of transmission rollers having camming surfaces which are received by said camming surface of said output shaft and said threaded bore of said elongated cylinder; and
   wherein when the stator is activated, said stator will cause said at least one magnet and said elongated cylinder to rotate, thereby causing said plurality of transmission rollers to engage and translate along said threaded bore, said plurality of transmission rollers engaging said camming surface of said output shaft facilitating translation of said output shaft relative to said output shaft in said elongated cylinder.

4. The valve gate assembly of claim 3, wherein said actuator assembly further comprises:
   each of said plurality of transmission rollers having a forward support axle extension and a rear support axle extension;
   a forward support ring having a plurality of support holes for receiving said forward support axle extensions of each of said plurality of transmission rollers;
   a rear support ring having a plurality of support holes for receiving said rear support axle extensions of each of said plurality of transmission rollers; and
   wherein said forward support ring and said rear support ring properly space said plurality of transmission rollers about said output shaft.

5. The valve gate assembly of claim 3, further comprising:
   said plurality of transmission rollers having forward gear teeth and rear gear teeth;
   said output shaft having forward gear teeth and rear gear teeth in mesh with said forward gear teeth and said rear gear teeth of said plurality of transmission rollers; and
   wherein said forward gear teeth and said rear gear teeth of said plurality of transmission rollers are in mesh with said forward gear teeth and said rear gear teeth of said output shaft and maintain the relative position of said plurality of transmission rollers relative to said output shaft as said output shaft translates in said threaded bore.

6. The valve gate assembly of claim 3, wherein said camming surface of said output shaft is one selected from the group comprising annular rings, annular ribs, or surface forming annular grooves in said output shaft.

7. The valve gate assembly of claim 3, wherein said camming surface of said plurality of transmission rollers is a slated surface of said rollers.

8. The valve gate assembly of claim 1, wherein said actuator assembly is controlled by a closed-loop feedback control system.

9. The valve gate assembly of claim 8, said closed-loop feedback control system comprising:

a master controller for detecting the position of said valve;
a rotary position sensor for detecting the position of said actuator assembly, and delivering the position of said actuator assembly to a controller; and
wherein said master controller will receive the position of said valve and the position of said actuator from said controller, and command said controller to change the position of said actuator assembly when the position of said valve does not match the commanded position delivered to said actuator assembly from said controller.

10. The valve gate assembly of claim 1, wherein said actuator assembly is operable to move said valve incrementally between said open position and said closed position.

11. The valve gate assembly of claim 10, wherein said actuator is operable to move said valve in approximately 0.001 inch increments between said open position and said closed position.

12. The valve gate assembly of claim 1, wherein the distance said actuator moves said valve between said open position and said closed position is approximately one inch.

13. A valve gate assembly for an injection molding machine, comprising:
a valve gate having a valve operable for being moved between a fully open position and a fully closed position to control the movement of a flowable material into a cavity;
an axially movable output shaft in substantial axial alignment with said valve; and
an actuator assembly coupled to said axially movable output shaft through a transmission assembly, wherein said transmission assembly translates rotary motion of said actuator assembly to linear motion of said output shaft for driving said valve and opening said valve gate, and said actuator assembly operable for providing movement of said valve between said fully open position and said fully closed position, and stopping said valve at any position therebetween.

14. The valve gate assembly for an injection molding machine of claim 13, said valve further comprising a pin disposed within a flow passage, at least a portion of said flow passage being larger in diameter than said pin.

15. The valve gate assembly for an injection molding machine of claim 13, wherein said actuator assembly is controlled by a closed-loop feedback system.

16. The valve gate assembly for an injection molding machine of claim 15, said closed loop feedback system further comprising:
at least one sensor; and
a controller, said at least one sensor electrically connected to said controller for controlling said valve, wherein said controller commands said actuator assembly to move said valve to a specific position, and the position and velocity of said valve is measured to allow said controller to calculate the resulting position of said valve.

17. The valve gate assembly for an injection molding machine of claim 16, said at least one sensor operable for detecting the flow of molten material into said cavity.

18. The valve gate assembly for an injection molding machine of claim 16, said at least one sensor further comprising a feedback sensor operable for detecting the velocity and position of said valve, and communicating the velocity and position of said valve to said controller.

19. The valve gate assembly for an injection molding machine of claim 18, wherein said feedback sensor provides substantially continuous and substantially linear feedback of the velocity of said valve to said controller.

20. The valve gate assembly for an injection molding machine of claim 13, wherein said actuator assembly is one selected from the group consisting of a linear motor, a brushless direct current (DC) motor, linear synchronous motor, linear drive, linear servo, and a linear tubular motor.

21. The valve gate assembly for an injection molding machine of claim 13, wherein the range of movement of said valve between said fully open position and said fully closed position is approximately one inch.

22. The valve gate assembly for an injection molding machine of claim 13, wherein said actuator assembly is operable to move said valve incrementally.

23. The valve gate assembly for an injection molding machine of claim 22, wherein said actuator assembly is operable to move said valve in increments of 0.001 inch.

24. A valve gate assembly for an injection molding machine, comprising:
a valve operable for opening an closing a valve gate, said valve being moved incrementally between an open position and a closed position;
an actuator assembly having an axially movable output shaft operable for moving said valve;
a transmission assembly operable for translating rotary motion of said actuator to linear motion of said output shaft for driving said valve and opening said valve gate; and
a pin formed as part of said valve for allowing or preventing the flow of molten material through said valve gate, said axially movable output shaft in substantial axial alignment with said valve.

25. The valve gate assembly for an injection molding machine of claim 24, said valve being operable for movement in increments of 0.001 inch.

26. The valve gate assembly for an injection molding machine of claim 24, wherein the distance between said fully open position and said fully closed position is approximately one inch.

27. The valve gate assembly for an injection molding machine of claim 24, further comprising a flow passage, wherein said pin is at least partially disposed in said flow passage, and at least a portion of said flow passage is larger in diameter than said pin.

28. The valve gate assembly for an injection molding machine of claim 24, wherein said actuator assembly is controlled by a closed loop feedback system, comprising:
a plurality of sensors, one of said plurality of sensors being operable for detecting the flow of molten material into said cavity; and
a controller operable for receiving a signal from one or more of said plurality of sensors.

29. The valve gate assembly for an injection molding machine of claim 28, one of said plurality of sensors further comprising a feedback sensor, said feedback sensor being operable for detecting the velocity and position of said valve, and communicating the velocity and position of said valve to said controller, wherein said feedback sensor provides substantially continuous and substantially linear feedback of the velocity of said valve to said controller.

30. The valve gate assembly for an injection molding machine of claim 24, said actuator assembly being operable to move said valve incrementally in 0.001 inch increments.

31. The valve gate assembly for an injection molding machine of claim 24, wherein the range of movement of said valve between said fully open position and said fully closed position is approximately one inch.

32. The valve gate assembly for an injection molding machine of claim 24, wherein said actuator assembly is one selected from the group consisting of a linear motor, a brushless direct current (DC) motor, linear synchronous motor, linear drive, linear servo, and a linear tubular motor.

* * * * *